United States Patent
Anholt et al.

(10) Patent No.: US 10,634,776 B2
(45) Date of Patent: Apr. 28, 2020

(54) TIME OF FLIGHT ESTIMATION USING AN ASYMMETRIC SCHEME

(71) Applicant: Apple Inc., Cupertino, CA (US)

(72) Inventors: Micha Anholt, Cupertino, CA (US); Gilad Kirshenberg, Cupertino, CA (US); Yoav Feinmesser, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 298 days.

(21) Appl. No.: 15/712,992

(22) Filed: Sep. 22, 2017

(65) Prior Publication Data

US 2018/0088222 A1 Mar. 29, 2018

Related U.S. Application Data

(60) Provisional application No. 62/398,887, filed on Sep. 23, 2016.

(51) Int. Cl.

| *G01S 13/08* | (2006.01) |
| *G01S 5/02* | (2010.01) |
| *G01S 11/02* | (2010.01) |
| *G01S 13/74* | (2006.01) |
| *H04W 84/00* | (2009.01) |
| *H04W 64/00* | (2009.01) |
| *H04W 4/029* | (2018.01) |

(52) U.S. Cl.
CPC ............ *G01S 13/08* (2013.01); *G01S 5/0215* (2013.01); *G01S 11/02* (2013.01); *G01S 13/74* (2013.01); *H04W 4/029* (2018.02); *H04W 64/003* (2013.01); *H04W 84/005* (2013.01)

(58) Field of Classification Search
CPC ........ G01S 13/08; G01S 5/0215; G01S 11/02; G01S 13/74; H04W 64/003; H04W 84/005; H04W 4/028; H04W 4/029
USPC ......................................................... 342/118
See application file for complete search history.

(56) References Cited

U.S. PATENT DOCUMENTS

| 2009/0067850 A1* | 3/2009 | Mizutani ............... H04J 3/0605 398/154 |
| 2011/0074634 A1* | 3/2011 | Yeo ......................... G01S 5/021 342/458 |
| 2013/0336131 A1* | 12/2013 | Zhang ................... H04W 24/00 370/252 |

(Continued)

*Primary Examiner* — Timothy X Pham
(74) *Attorney, Agent, or Firm* — Sterne, Kessler, Goldstein & Fox P.L.L.C.

(57) ABSTRACT

Embodiments for accurately performing time of flight estimations are provided. These embodiments include using a first wireless device to monitor a wireless link and subsequently generate a wireless link estimation based on the monitoring. The embodiments also include deriving a correction metric based on the generated wireless link estimation and transmitting the correction metric from the first wireless device to a second wireless device. The second wireless device may then calculate a time of arrival of a first signal received from the first wireless communication device and correct any errors associated with the time of arrival calculation using the received correction metric. Further, the second wireless device may transmit the corrected time of arrival back to the first wireless device, such that the first wireless device can use the corrected time of arrival to estimate the time of flight of the first signal.

20 Claims, 5 Drawing Sheets

(56) References Cited

U.S. PATENT DOCUMENTS

| | | | | |
|---|---|---|---|---|
| 2014/0335885 A1* | 11/2014 | Steiner | .................. | H04W 64/00 |
| | | | | 455/456.1 |
| 2015/0222602 A1* | 8/2015 | Steiner | ................ | H04L 63/0428 |
| | | | | 713/168 |
| 2017/0234965 A1* | 8/2017 | Taylor, Jr. | .................. | G01S 5/10 |
| | | | | 340/539.13 |
| 2019/0141478 A1* | 5/2019 | Nallampatti Ekambaram | ............ | |
| | | | | H04W 4/023 |

* cited by examiner

TIME OF FLIGHT ESTIMATION USING AN ASYMMETRIC SCHEME

CROSS-REFERENCE TO RELATED APPLICATION

The present application claims benefit of provisional U.S. Patent Application No. 62/398,887, titled "Time of Flight Estimation Using an Asymmetric Scheme" filed on Sep. 23, 2016, which is incorporated herein by reference in its entirety.

FIELD

The disclosure generally relates to wireless communications, including to performing time of flight calculations in a wireless communication environment.

BACKGROUND

Relate Art

Over the past few decades, consumer electronic devices have become an increasingly important part of everyday life. These electronic devices include everything from cellphones, laptops, and tablets to televisions and smartwatches, to name just a few examples. More recently, many consumer electronic devices have been adapted to include wireless communication capabilities, such that these devices can communicate and coordinate with one another. For example, with the increasingly widespread availability and use of wirelessly-enabled electronic devices, individuals may now be able to perform a multitude of tasks, such as wirelessly unlocking/locking a vehicle or computer (or other device), and wirelessly interacting with a television or other media device, using a cellphone, tablet, and/or smartwatch.

While the ability for these electronic devices to wirelessly communicate with one another brings about exciting new opportunities, these advancements also introduce new challenges. One such challenge involves the need to accurately determine a separation distance between two wirelessly-enabled electronic devices (e.g., time of flight). In today's wireless communication environments, the separation distance between two devices is often linked to the devices' ability to perform a particular function. For example, the ability to unlock an individual's computer may be dependent on the separation distance between the computer and the device initiating the unlock request. In such a scenario, it may be undesirable to allow the computer to become unlocked when the individual's cellphone or smartwatch (and thus presumably the individual) is an indeterminate distance away, as a large separation could potentially allow an unintended third party to gain unauthorized access to the computer.

Conventional methods for performing time of flight estimations are subject to errors caused by various factors, such as multipath fading, and are thus often inaccurate. These errors are especially prevalent in environments having limited bandwidth, such as a WiFi environment. Moreover, conventional techniques that exist for compensating for these errors require the use of overly-complex algorithms that require significant processing power, which often limits their practicable use in today's wireless communication environments.

SUMMARY

The present disclosure provides system, apparatus, method, and computer program product embodiments for performing time of flight calculations.

Time of flight generally refers to the time that it takes for a radio wave carried message to travel from a first device to a second device, and is often used to determine a separation distance between the two devices. Conventional methods for estimating time of flight can be undesirable in some instances because such methods are vulnerable to errors, such as those caused by multipath fading. Multipath fading is a propagation phenomenon that results in wireless signals reaching the second device by two or more paths, and could be caused by refraction and/or reflection from other objects within a wireless environment. When multiple signals are received by the second device—e.g., over the two or more paths—it becomes difficult for the second device to make an accurate time of arrival calculation, which can result in inaccuracies in the corresponding time of flight calculation.

A conventional method for estimating a time of flight between two un-synchronized devices may implement a two-way transmitting scheme where the first device transmits a signal to the second device, followed by the second device transmitting a signal back to the first device. Each device may compute the time difference between its own transmission and reception (e.g., time of flight), and may also estimate its respective line of sight, relative to the other device, to determine the time-of arrival of the two transmitted signals. The time of flight may then be extracted from the time of arrival and time of departure calculations made by both devices. In such a convention method, it may be necessary for both devices to make line-of-sight estimations to determine accurate time of arrival estimates. But, as will be apparent to those skill in the art(s), both time of arrival estimates may be susceptible to the effects of multipath-fading channel.

In many cases, the first device, for example, may have more or superior capabilities that allow it to determine its line of sight with a higher degree of accuracy than is capable with the second device (with may be a less capable device). Embodiments discussed herein produce highly accurate time of flight estimations by leveraging the superior capabilities of the first device to compensate for the errors that may be present in the second device's timing calculations. The improved time of flight estimation embodiments disclosed herein may be applicable to several different types of wireless technologies, such as, without limitation, Wi-Fi, Bluetooth, radio-frequency identification (RFID), near field communications (NFC), 60 GHz communications, and cellular communication, as well as several different types of wireless communication devices, to name just a few examples.

In some embodiments, time of flight estimation may include generating a wireless channel estimation at the first device, using the wireless channel estimation to estimate a true line of sight for the first device (e.g., corresponding to the signal received by the first device from the second device). The first device can then use the reciprocal nature of the multipath channel to generate a correction metric, which the first device may also transmit to the second device such that the second device can use the correction metric to correct any errors in its own line-of-sight estimation (e.g., corresponding to the signal received by the second device from the first device) that may have been caused by multipath fading, for example. In some embodiment, the correction metric may contain a compressed representation of the wireless channel estimation. The first device may then transmit a correction metric, which may be based on one or more of the aforementioned estimations and representations (or others discussed herein), to the second device. The second device may then use the received correction metric to correct errors in its timing calculations, such as those that may be caused by multipath fading effects on the devices' respective line of sight estimations.

In some embodiments, the received correction metric allows the second device to correct or adjust its determination of a time of arrival of a radio wave carried message received from the first device. Conversely, conventional methods for estimating time of flight do not include the ability to share wireless channel information (e.g., a correction metric) between the devices. Instead, wireless communication devices in an asymmetric system using these conventional methods each attempt to estimate the wireless channel independently of one another, often resulting in inaccurate timing measurements caused by the less capable device.

In some embodiments, using the corrected timing calculations (e.g., a corrected time of arrival) from the second device, the first device can accurately calculate the time of flight of a radio wave carried message transmitted to the second device. Once the time of flight has been calculated, the first device can then accurately calculate its separation distance from the second device, and can optionally compare the calculated separation distance to a known acceptable separation distance to determine whether the devices are close enough to allow certain communicated signals (e.g., unlock signals) to elicit responsive actions (e.g., unlocking the contents of one of the devices).

Thus, time of flight estimation embodiments disclosed herein may reduce and/or substantially eliminate time of flight estimation errors caused by, for example, multipath fading.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

Figure 1:
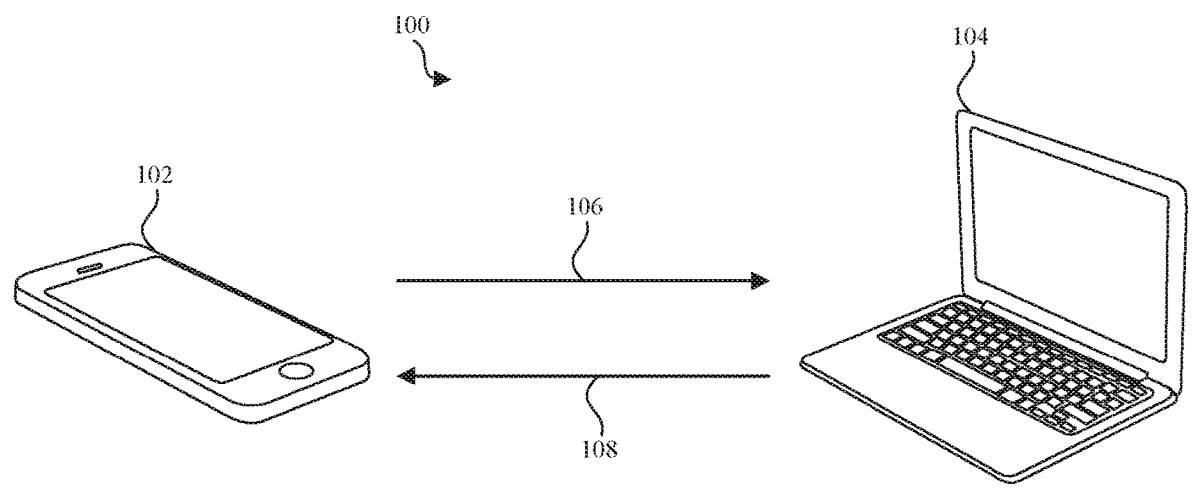
FIG. 1 illustrates a block diagram of an example wireless communication environment according to some embodiments.

FIG. 1 illustrates a block diagram of a wireless communication environment 100 according to an exemplary embodiment of the disclosure. Wireless communication environment 100 provides wireless communication of information, such as but not limited to one or more commands and/or data, between a first wireless communication device 102 and a second wireless communication device 104. Those skilled in the relevant art(s) will appreciate that wireless communication devices 102 and 104 may be configured to communicate using any one of Wi-Fi, Bluetooth, radio-frequency identification (RFID), near field communications (NFC), 60 GHz, communications, cellular communication, to name just a few examples. Additionally, each of wireless communication devices 102 and/or 104 may be implemented as a standalone or a discrete device or may be incorporated within or coupled to another electrical device or host device, such as a mobile phone, a smartwatch, a portable computing device, a camera, a Global Positioning System (GPS) unit, or another computing device such as a personal digital assistant, a video gaining device, a laptop, a desktop computer, a tablet, or a computer peripheral such as a printer or a portable audio and/or video player, and could also be implemented as a key fob, a vehicle remote access device or access/locking device in other mechanisms, or a household appliance, to provide just some examples and/or any other suitable electronic device that will be apparent to those skilled in the relevant art(s) without departing from the spirit and scope of the present disclosure.

In some embodiments, first wireless communication device 102 may be configured to transmit a first wireless signal 106 to second wireless communication device 104 using any acceptable modulation scheme. Second wireless communication device 104 may be configured to receive first wireless signal 106, process the received first wireless signal 106 and, if necessary, transmit a second wireless signal 108 back to first wireless communication device 102. In this manner, first wireless communication device 102 and second wireless communication device 104 exchange information ("communicate") with one another. The signals 106, 108 exchanged between first and second wireless communication devices 102 and 104 may represent any number of different signals types, including: activation/deactivation signals, lock/unlock signals, status manipulation signals, other information and/or commands, to provide some examples.

First wireless communication device 102 may represent an exemplary embodiment of a first user equipment, such as a smartwatch, tablet, mobile phone, etc., and second wireless communication device 104 may represent an exemplary embodiment of a second user equipment, such as a laptop, desktop computer, etc. It is noted that these wireless communication devices 102, 104 are not limited to these examples.

In some embodiments, second wireless communication device 104, e.g., a computer, may be configured such that, at a first point in time, it is placed into a locked state thereby rendering it and its contents inaccessible. Computer 104 may also be configured such that it can be unlocked using first wireless communication device 102, e.g., a smartwatch. In such a scenario, first wireless communication device 102 may announce its presence and request that second wireless communication device 104 change its status from locked to unlocked using one or more first wireless signals 106. Second wireless communication device 104 may respond by verifying the identity of first wireless communication device 102 and the action being requested using one or more second wireless signals 108. Once verified, second wireless communication device 104 may change its current state from locked to unlocked. For example, a lock screen on second wireless communication device may be removed without manual entry of a credential or other authentication information.

In some instances, however, it may be undesirable to allow a signal transmitted from first wireless communication device 102 to elicit a responsive action from second wireless communication device 104, such as when first wireless communication device 102 is located beyond a threshold distance from second wireless communication device 104. For example, in an exemplary scenario where second wireless communication device 104 represents a user's computer and where first wireless communication device 102 represents a smartwatch (or smart phone) worn by the user, the user may not want the smartwatch to unlock the computer when the user is still outside of, e.g., visual range of the computer. Indeed, if the smartwatch (102) was permitted to unlock the computer (104) from a greater distance, an unauthorized third party may gain access to the computer while it is in an unlocked state and unattended. Therefore, a time of flight estimation used to determine the separation between the first wireless communication device 102 and the second wireless communication device 104 must be accurate. Although the previous discussion referred to the ability to use a first device, e.g., a smartwatch, to lock/unlock a second device, e.g., a computer, this example is not intended to limit the scope of the present disclosure. Indeed, the time of flight estimation techniques disclosed herein are equally applicable to other types of interactions and other types of user equipment without departing from the spirit and scope of the present disclosure.

Therefore, in some embodiments, to ensure that second wireless communication device 104 does not perform an action in response to a request from first wireless communication device 102 based on an inaccurate distance (or separation) estimation, second wireless communication device 104 may also be configured to accurately estimate a separation distance between itself and first wireless communication device 102 (e.g., using time of flight). In doing so, second wireless communication device 104 can ensure that it only responds to first wireless signals 106 when first wireless communication device 102 is within a predetermined separation distance. In some embodiments, an the predetermined separation distance may extend up to several meters away from second wireless communication device 104, yet other separation distances may also be possible without departing from the spirit and scope of the present disclosure. Indeed, a separation distance (or range) that may enable triggering a function can be set appropriately for that function.

While conventional methods exist for allowing wireless communication devices to estimate their respective separation distances from one another, these conventional methods have several shortcomings, especially when applied to asymmetric systems (e.g., a wireless environment where one device has superior capabilities when compared to a second device). For example, conventional time of flight estimation methods are subject to the wireless communication phenomenon known as multipath fading. Multipath fading is a propagation phenomenon that results in wireless signals reaching the receiving wireless device by two or more paths, and could be caused by refraction and/or reflection from other objects within the wireless environment. The effects of multipath fading can inject errors into the wireless environment, and thus result in inaccurate time of flight estimations. These errors may also be amplified in environments having limited bandwidth, such as a WiFi environment. One such conventional time of flight estimation method is illustrated in FIG. 2.

Figure 2:
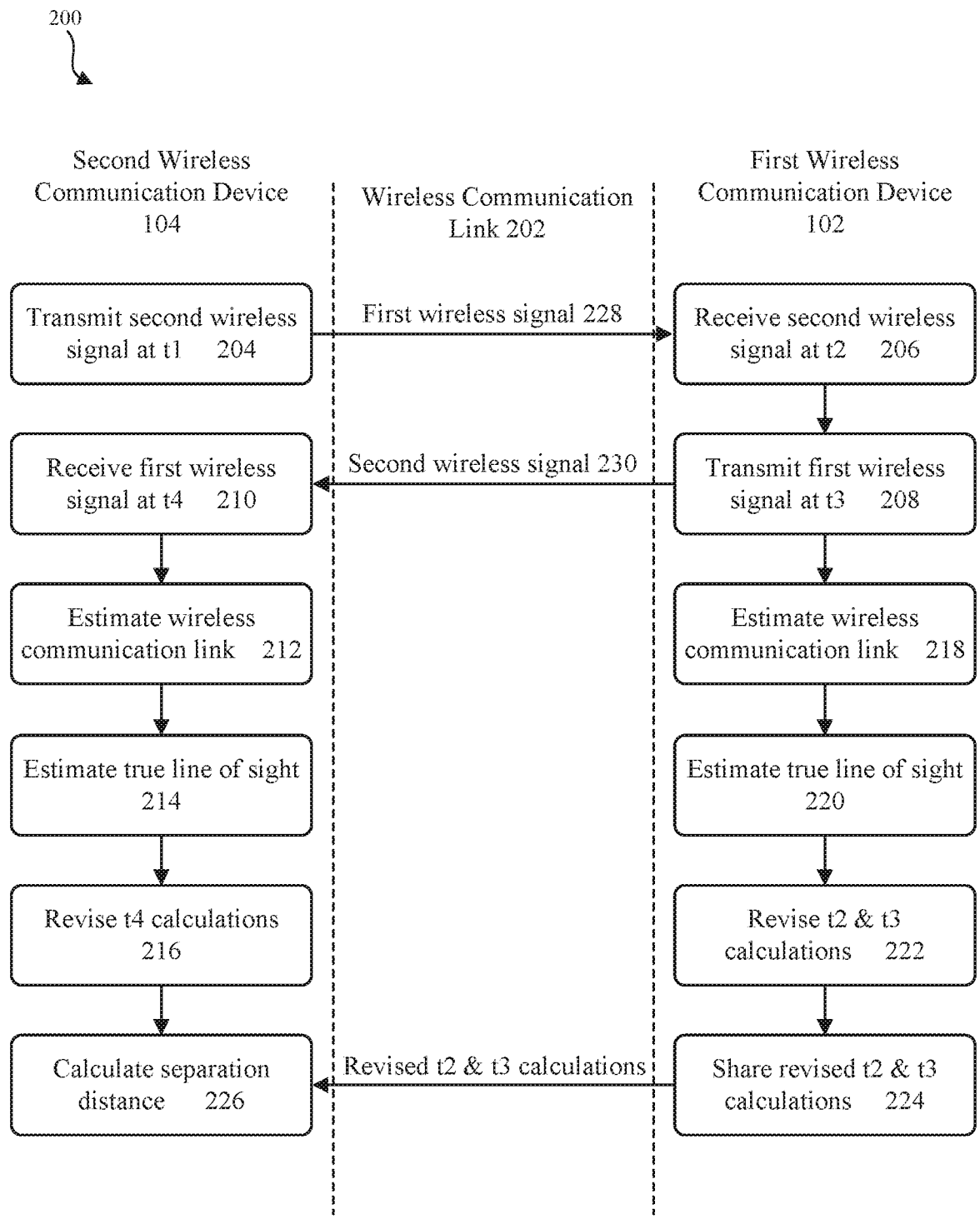
FIG. 2 is a flowchart of operational steps of a prior art method for determining a separation distance between wireless communication devices (e.g., time of flight).

FIG. 2 is a flowchart of operational steps of a prior art method 200 for determining a separation distance between wireless communication devices (e.g., time of flight). For illustrative purposes, the flowchart of FIG. 2 is described with reference to embodiments of FIG. 1.

Method 200 begins with operation 204, where second wireless communication device 104 transmits first wireless signal 228 to first wireless communication device 102 over a wireless communication link 202. The time at which second wireless communication device 104 transmits first wireless signal 228 is referred to herein as a first time of departure (t1). In operation 206, first wireless communication device 102 receives first wireless signal 228. The time at which first wireless communication device 102 receives first wireless signal 228 is referred to herein as a first time of arrival (t2). In operation 208, first wireless communication device 102 transmits second wireless signal 230 to second wireless communication device 104. The time at which first wireless communication device 102 transmits second wireless signal 230 is referred to herein as a second time of departure (t3). In operation 210, second wireless communication device 104 receives second wireless signal 230. The time at which second wireless communication device 104 receives second wireless signal 230 is referred to herein as a second time of arrival (t4).

While second wireless communication device 104 is capable of estimating the second time of arrival (t4), this estimation may not be an accurate representation of the true line of sight from first wireless communication device 102 to second wireless communication device 104 due to the presence of multipath fading in real world wireless environments. For example, during transmission of second wireless signal 230 from first wireless communication device 102, the refraction and/or reflection caused by multipath fading may result in multiple versions of second wireless signal 230 being received by second wireless communication device 104. Additionally, each iteration of second wireless signal 230 may be received by second wireless communication device 104 at a different time. Therefore, in the presence of multipath fading, second wireless communication device 104 may have difficulty determining the true line of sight from first wireless communication device 102 to second wireless communication device 104. In such a scenario, the true line of sight may represent a signal path from first wireless communication device 102 to second wireless communication device 104 that is substantially free from the effects of multipath fading.

Due to these multipath fading issues, second wireless communication device 104 may also generate an estimation of the characteristics of wireless communication link 202 in operation 212. In some embodiments, the channel estimation performed in operation 212 may include generating a channel model, or collecting channel state information, such as information relating to how first and second wireless signals 228 and 230 propagate over wireless communication link 202 taking into account the combined effect of multipath fading, for example. In operation 214, second wireless communication device 104 may use the wireless communication link estimation from operation 212 to estimate the true line of sight from first wireless communication device 102 to second wireless communication device 104. For example, second wireless communication device 104 may estimate the true line of sight by identifying the time at which the first version of second wireless signal 230 is received from first wireless communication device 102 over any of the multipath channels. In some embodiments, the time at which the first version of second wireless signal 230 is received at second wireless communication device 104 may be an accurate representation of the true line of sight from first wireless communication device 102 to second wireless communication device 104, because the first received version of second wireless signal 230 may be indicative of a signal that was received over a substantially clean channel—e.g., a channel that is not significantly affected by multipath fading.

In operation 216, second wireless communication device 104 may use the true line of sight estimation from operation 214 to revise its original estimation of the second time of arrival (t4) from operation 210.

In operations 218-222, first wireless communication device 102 may perform substantially similar functions to those performed by second wireless communication device 104 in operations 212-216. For example, first wireless communication device 102 may generate an estimation of the characteristics of wireless communication link 202 in operation 218, and in operation 220, first wireless communication device 102 may use the wireless communication link estimation to estimate the true line of sight from second wireless communication device 104 to first wireless communication device 102. First wireless communication device 102 may estimate the true line of sight from second wireless communication device 104 to first wireless communication device 102 by identifying the time at which the first version of first wireless signal 228 is received from second wireless communication device 104 over any of the multipath channels. In operation 222, first wireless communication device 102 may then use the true line of sight estimation from operation 220 to revise its original estimation of the first time of arrival (t2) from operation 206, as well as its estimation of the second time of departure (t3) from operation 208.

Subsequently, in operation 224, first wireless communication device 102 may share its revised first time of arrival (t2) and second time of departure (t3) calculations with second wireless communication device 104.

Upon receipt of the revised t2 and t3 calculations from first wireless communication device 102, second wireless communication device 104 has the necessary information to calculate the time of flight (Tof) relative to first wireless communication device 102. Indeed, Tof can be calculated using the four timestamps (t1-t4) determined in operations 204, 216, and 222. Specifically, at operation 226, second wireless communication device 104 can calculate Tof using the following equation:

$$Tof = t2 - t1 = t4 - t3 = \frac{(t2-t1)+(t4-t3)}{2} = \frac{(t4-t1)-(t3-t2)}{2}$$

Once Tof has been calculated, second wireless communication device 104 can then calculate its separation distance from first wireless communication device 102 in operation 212 using the following equation: Distance=C*Tof, where C represents the speed of light ($3*10^8$ meters/second).

As discussed above, second wireless communication device 104 may compare the calculated separation distance to a known acceptable separation distance to determine whether first wireless communication device 102 is close enough to perform a function. For example, whether, based on the determined distance, second wireless communication device 104 should allow a signal transmitted from first wireless communication device 102 (e.g., an unlock signal) to elicit a responsive action (e.g., unlocking the contents of the device). In some implementations, the estimated distance alone may serve as a trigger for performing a function. For example, upon second wireless communication device 104 determining that first wireless communication device 102 is within a predetermined distance, second wireless communication device 104 can perform a function (e.g., removing a lock screen or other such device protection).

While the prior art method outlined in FIG. 2 may provide second wireless communication device 104 with an estimate of its separation distance from first wireless communication device 102, such an estimate may not reliable when first wireless communication device lacks the capabilities necessary to generate an accurate estimation of the characteristics of wireless communication link 202. In such a scenario, the revised first time of arrival (t2) and second time of departure (t3) calculations created by first wireless communication device 102 may be inaccurate. And as discussed previously, any inaccuracies in t2 and/or t3 will result in inaccuracies in second wireless communication device 104's time of flight estimation, as well as corresponding inaccuracies in its separation distance estimation.

However, in accordance with some embodiments of the present disclosure, a method can be implemented that allows for improved time of flight estimations in the presence of multipath fading. The improved time of flight estimations can be determined even when first wireless communication device 102 lacks the capabilities necessary to generate a highly accurate estimation of the characteristics of wireless communication link 202. In some embodiments, this time of flight estimation method involves leveraging the capabilities of a more capable device (e.g., second wireless communication device 104 can be a computer) to reduce and/or substantially eliminate the time of flight estimation errors caused by multipath fading that a less capable device (e.g., first wireless communication device 102 can be a smartwatch) may not be capable of eliminating itself. For example, second wireless communication device 104 (e.g., a computer) may have certain capabilities that allow it to accurately estimate and/or characterize wireless communication link 202, and in doing so, provide first wireless communication device 102 (e.g., a smartwatch) with a correction metric that it can use to generate a more accurate estimation of the true first time of arrival (t2) and true second time of departure (t3) than the estimation that first wireless communication device 102 is capable of providing. The capabilities that second wireless communication device 104 may have that allow it to accurately estimate wireless communication link 202 may include any/all of: having multiple antennas (thereby enabling spatial diversity), having an improved noise floor, having an ability to analyze the transmission and reception of previously communicated signals (thereby enabling time diversity), having improved computational abilities (e.g., the ability to implement a super-resolution algorithm), having dedicated hardware for processing multipath signals, and having improved processing power, to provide some examples. Second wireless communication device 104 also may have one or more capabilities that can be used to estimate wireless communication link 202 that will be apparent to those skilled in the relevant art(s) without departing from the spirit and scope of the present disclosure.

As discussed above, a wireless environment where second wireless communication device 104 has superior capabilities when compared to first wireless communication device 102 may be referred to as an asymmetric wireless environment, and may be well particularly suited for the improved time of flight estimation embodiments disclosed herein.

Figure 3:
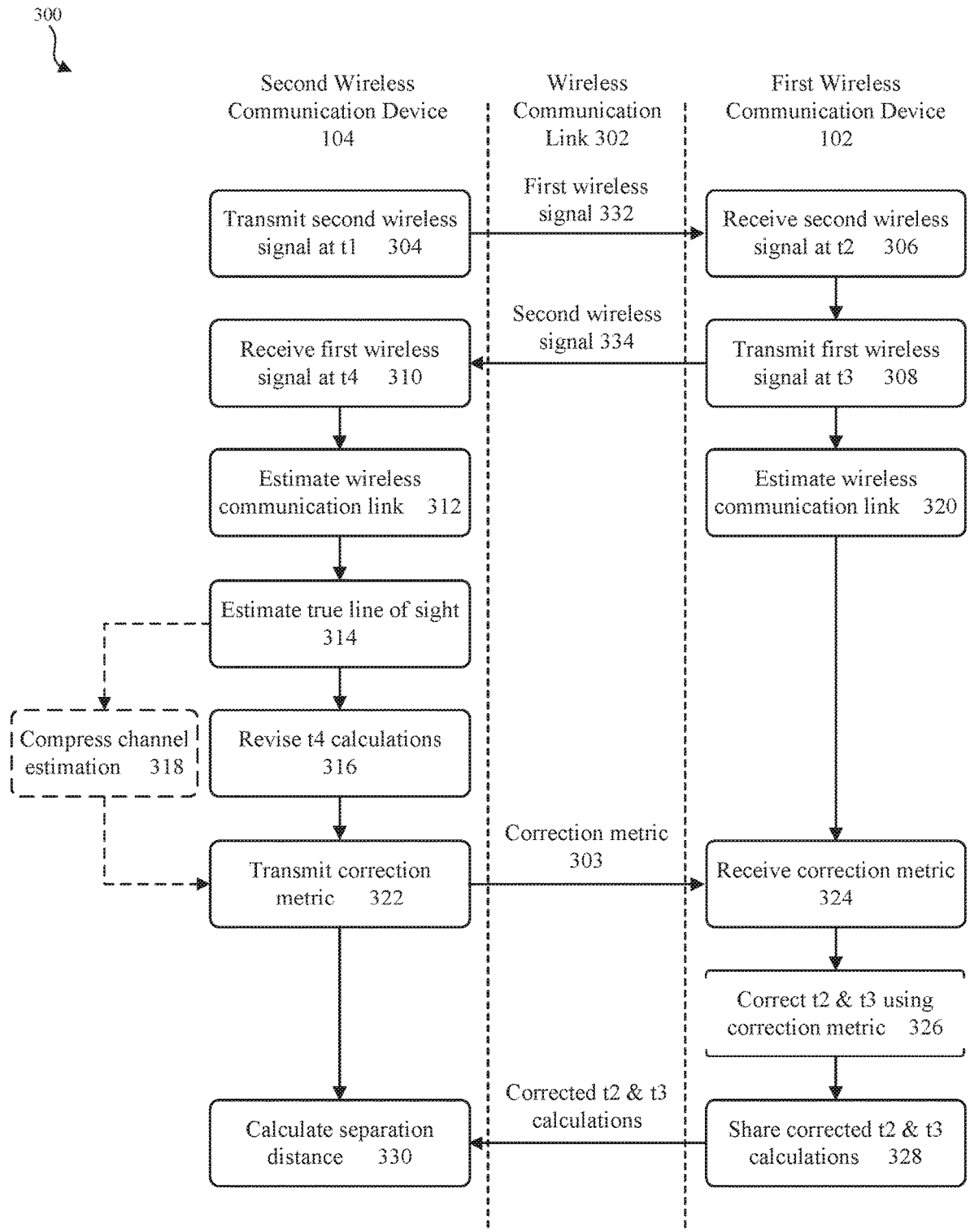
FIG. 3 is an example flowchart of exemplary operational steps of estimating a separation distance between wireless communication devices (e.g., time of flight) according to some embodiments.

FIG. 3 is a flowchart of a method 300 for estimating a separation distance between a first and second wireless communication device (e.g., time of flight) according to some embodiments of the present disclosure. The disclosure is not limited to this operational description. Rather, it will be apparent to persons skilled in the relevant art(s) from the teachings herein that other operational control flows are within the spirit and scope of the present disclosure. For illustrative purposes, method 300 of FIG. 3 is described with reference to the embodiments of FIG. 1. However, method 300 is not limited to these embodiments and instead is applicable to any wireless environment where the calculation of a separation distance between electronic devices would be useful.

Method 300 begins with operation 304, where second wireless communication device 104 transmits first wireless signal 332 to first wireless communication device 102 over a wireless communication link 302. The time at which second wireless communication device 104 transmits first wireless signal 332 is referred to herein as a first time of departure (t1). In operation 306, first wireless communication device 102 receives first wireless signal 332. The time at which first wireless communication device 102 receives first wireless signal 332 is referred to herein as a first time of arrival (t2). In operation 308, first wireless communication device 102 transmits second wireless signal 334 to second wireless communication device 104. The time at which first wireless communication device 102 transmits second wireless signal 334 is referred to herein as a second time of departure (t3). In operation 310, second wireless communication device 104 receives second wireless signal 334. The time at which second wireless communication device 104 receives second wireless signal 334 is referred to herein as a second time of arrival (t4).

Subsequently in operation 312, second wireless communication device 104 generates an estimation of the characteristics of wireless communication link 302. In some embodiments, the channel estimation performed in operation 304 may be include generating a channel model, or collecting channel state information, such as information relating to how first and second wireless signals 332 and 334 propagate over wireless communication link 302 taking into account the combined effect of multipath fading, for example.

Moreover, in some embodiments, second wireless communication device 104 may have more or superior capabilities when compared to first wireless communication device 102, which in turn may allow second wireless communication device 104 to generate a more accurate estimation or characterization of wireless communication link 302. As discussed previously herein, second wireless communication device 104's more or superior capabilities may include having multiple antennas, having superior computational abilities, having superior processing power, etc. As will be discussed in further detail with reference to FIG. 4 below, using these superior capabilities, second wireless communication device 104 in operation 312 may be able to accurately estimate or characterize each of the various multipath channels that may exist between the first and second wireless communication devices 102 and 104, and may also be able to accurately predict which of the various multipath channels most closely represents the wireless channel seen by the first wireless communication device 102.

In operation 314, second wireless communication device 104 may use the wireless communication link estimation from operation 312 to estimate a true line of sight from first wireless communication device 102 to second wireless communication device 104. In some embodiments, this true line of sight may represent the time that it takes for second wireless communication device 104 to receive a signal transmitted from first wireless communication device 102 over wireless communication link 302, taking into account the estimation of the characteristics of wireless communication link 302 generated in operation 312. As will be discussed in further detail with reference to FIG. 4 below, second wireless communication device 104 may estimate this true line of sight by analyzing the characteristics of each of the various multipath channels that may exist between the first and second wireless communication devices 102 and 104, and identifying when the first signal reception of a wireless signal from first wireless communication device 102 occurred at second wireless communication device 104 over any of the multipath channels. In some embodiments, the time that it takes for the first signal to be received at second wireless communication device 104 may be an accurate representation of the true line of sight from first wireless communication devices 102 to second wireless communication device 104; this is further described below.

In operation 316, second wireless communication device 104 may use the true line of sight estimation from operation 314 to revise its original estimation of the second time of arrival (t4) from operation 310.

In operation 318, second wireless communication device 104 may optionally generate a compressed representation of the wireless communication link estimation. For example, in some embodiments, and as further described below, second wireless communication device 104 may optionally determine the difference between the peak of the wireless communication link estimation and the true line of sight, and may subsequently use this difference as a compressed representation of the wireless communication link estimation.

In operation 320, first wireless communication device 102 may generate an estimation of the characteristics of wireless communication link 302 using conventional techniques. As discussed above, first wireless communication device 102 may be a less capable device (e.g., a smartwatch) than second wireless communication device 104 (e.g., a computer), and therefore may not be capable of generating a highly accurate estimation of the characteristics of wireless communication link 302. As such, it may be advantageous for first wireless communication device 102 to be able to utilize the more accurate estimation generated by second wireless communication device 104 to reduce and/or substantially eliminate any first time of arrival (t2) and/or second time of departure (t3) calculations errors caused by multipath fading.

Therefore in operation 322, second wireless communication device 104 transmits a correction metric 303 to first wireless communication device 102, which is then received by first wireless communication device 102 in operation 324. The transmitted correction metric 303 may represent (and/or be based on) the wireless communication link estimation/characterization generated in operation 312, the estimated true line of sight generated in operation 314, the compressed representation of the wireless communication link estimation generated in operation 316, and/or any combination thereof. Subsequently in operation 326, first wireless communication device 102 uses the received correction metric 303 to correct (or adjust) its determination of the first time of arrival (t2) and/or second time of departure (t3).

In some embodiments, if the received correction metric 303 represents second wireless communication device 104's estimation/characterization of wireless communication link 302 (from operation 312), then first wireless communication device 102 may determine the cross-correlation (e.g., Xcorr operation) between second wireless communication device 104's estimation and its own estimation of wireless communication link 302. Further, in some embodiments, prior to performing an Xcorr operation, either first or second wireless communication device 102 or 104 may rotate second wireless communication device 104's wireless communication link estimation in the frequency domain such that the estimated true line of sight is indexed at zero.

Alternatively or additionally, if the received correction metric represents second wireless communication device 104's true line of sight estimation (from operation 314), then in operation 324 first wireless communication device 102 may use this true line of sight estimation (and/or the corresponding revised second time of arrival (t4) calculation from operation 316) to correct or adjust its own estimation of the time of arrival (t2). For example, first wireless communication device 102 may use a variation of the Tof equation presented above to determine a corrected time of arrival (t2) using the revised second time of arrival (t4), where t2=(t4−t3)+t1.

Alternatively or additionally, if the received correction metric represents second wireless communication device 104's compressed representation of the wireless communication link estimation (from operation 318), then in operation 326 first wireless communication device 102 may subtract the compressed representation (e.g., the difference between the peak of second wireless communication device 104's wireless communication link estimation and the true line of sight) from its own wireless communication link estimation generated in operation 320.

Accordingly, by transmitting a correction metric 303 to first wireless communication device 102, first wireless communication device 102 can more accurately determine first time of arrival (t2) without being required to possess certain additional or improved capabilities, such as the ability to implement a super-resolution algorithm.

In operation 328, first wireless communication device 102 shares its corrected first time of arrival (t2) and second time of departure (t3) calculations with second wireless communication device 104.

Upon receipt of the corrected t2 and t3 calculations from first wireless communication device 102, second wireless communication device 104 has the necessary information to accurately calculate the time of flight (Tof) relative to first wireless communication device 102. Indeed, Tof can be calculated using the four timestamps (t1-t4) determined in operations 304, 316, and 326. For example, in operation 330, second wireless communication device 104 can calculate Tof using the following equation:

$$Tof = t2 - t1 = t4 - t3 = \frac{(t2-t1)+(t4-t3)}{2} = \frac{(t4-t1)-(t3-t2)}{2}$$

Once Tof has been calculated, second wireless communication device 104 can then accurately calculate its separation distance from first wireless communication device 102 in operation 330 using the following equation: Distance=C*Tof, where C represents the speed of light ($3*10^8$ meters/second). Additionally, second wireless communication device 104 may compare the calculated separation distance to a predetermined separation distance (or trigger distance) to determine whether first wireless communication device 102 is close enough to allow a signal transmitted from first wireless communication device 102 (e.g., an unlock signal) to elicit a responsive action from second wireless communication device 104 (e.g., unlocking the contents of the device). In some implementations, the estimated distance alone may serve as a trigger for performing a function. For example, upon second wireless communication device 104 determining that first wireless communication device 102 is within a predetermined distance, second wireless communication device 104 can perform a function (e.g., removing a lock screen or other such device protection).

In some embodiments, the improved line of sight estimation method illustrated in FIG. 3 may be used to avoid having to synchronize both first and second wireless communication devices 102 and 104. For example, the correction metric 303 shared between first and second wireless communication devices 102 and 104, and the corresponding timing measurement corrections performed by first and second wireless communication devices 102 and 104 in operations 316 and 326 can compensate for any timing offset issues that may be caused by first and second wireless communication devices 102 and 104 not being synchronized with each other. The ability to implement method 300 in a wireless environment having unsynchronized devices may be particularly advantageous, because many of today's wireless environments include unsynchronized devices seeking to communicate with one another.

Figure 4:
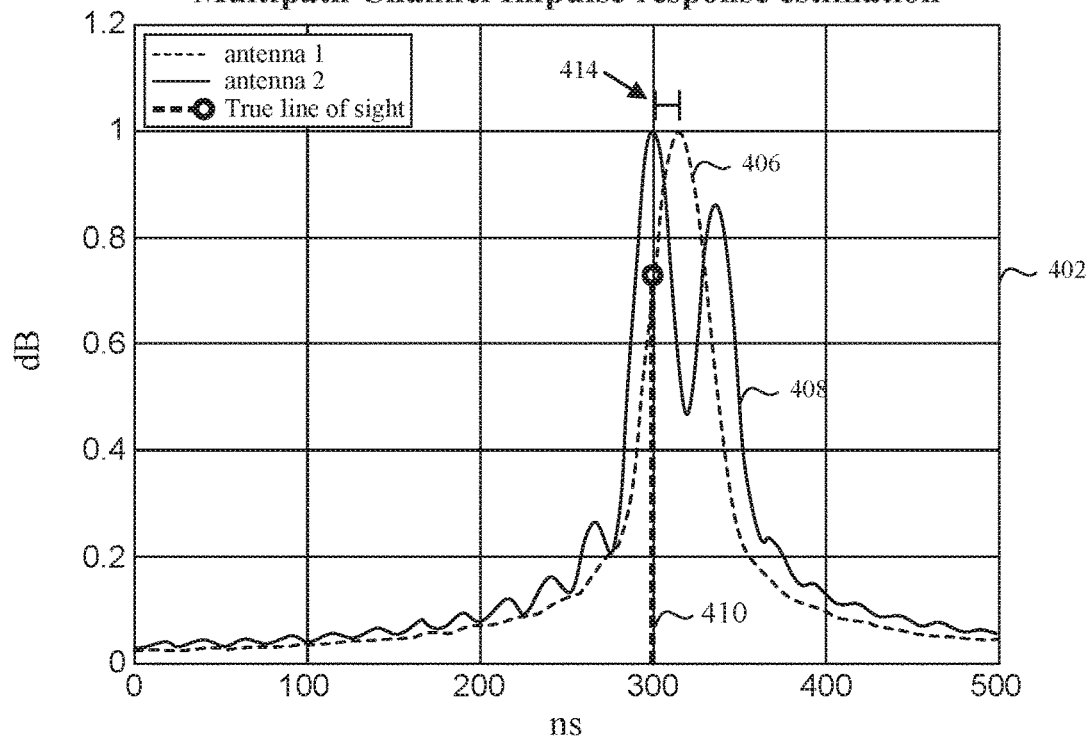
FIG. 4 is an example graphical representation of an exemplary application of the operational steps of estimating a separation distance between wireless communication devices (e.g., time of flight) according to some embodiments.
Figure 4:
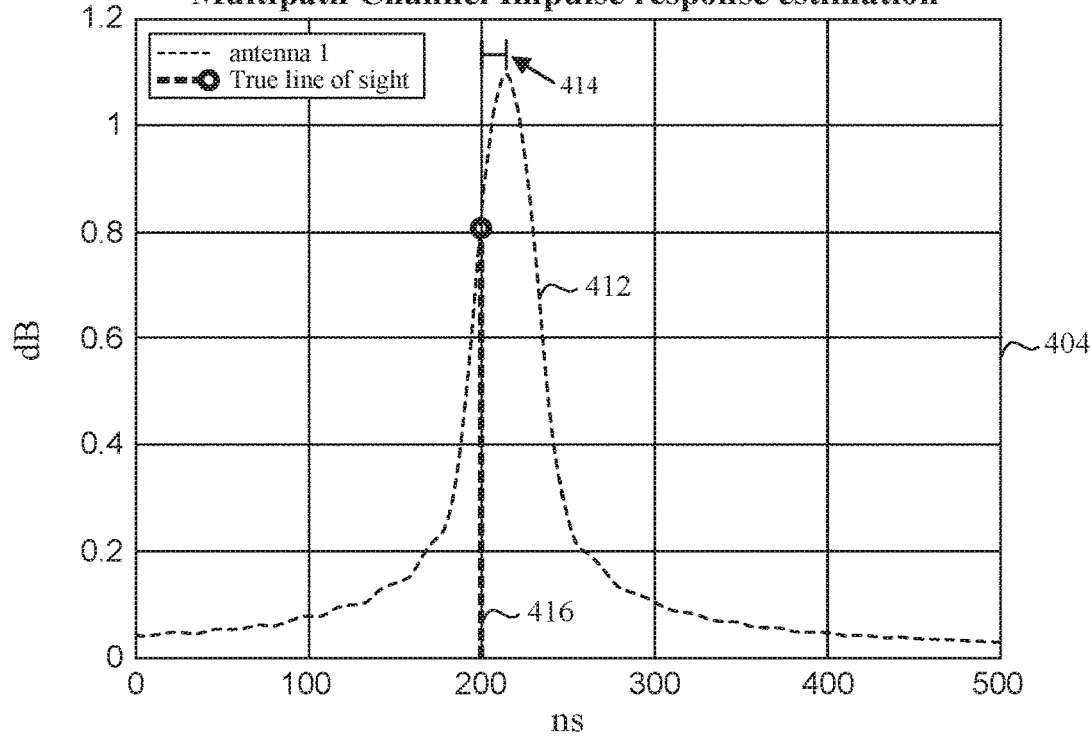

As discussed above, the improved tune of flight estimation method 300 of FIG. 3 can leverage several different capabilities that may be included within second wireless communication device 104, but which may not be included in first wireless communication device 102. As an illustrative non-limiting example, FIG. 4 provides a graphical representation of how the improved time of flight estimation method disclosed herein can leverage one such capability of second wireless communication device 104—e.g., second wireless communication device 104 having multiple antennas.

In some embodiments, graph 402 represents second wireless communication device 104's estimation of a wireless communication link 400 (not shown in FIG. 4) between first and second wireless communication devices 102 and 104 when subjected to the effects of multipath fading. As discussed above, second wireless communication device 104 may have two (or more) antennas whereas first wireless communication device 102 may only have a single antenna. Having multiple antennas may provide second wireless communication device 104 with a superior ability to estimate wireless communication link 400. Indeed, the presence of multiple antennas at second wireless communication device 104 increases the chances that a signal path from at least one of the antennas will be clean—e.g., will experience minimal multipath fading. Therefore, in such a scenario, second wireless communication device 104 is a more capable device than first wireless communication device 102, and as a result, second wireless communication device 104 may be able to more accurately estimate wireless communication link 400.

In some embodiments, to estimate the characteristics of wireless communication link 400, second wireless communication device 104 may generate a first multipath channel impulse response estimation 406 for the multipath channel seen by the first antenna, and may also generate a second multipath channel impulse response estimation 408 for the multipath channel seen by the second antenna. In some embodiments, impulse response estimations 406 and 408 may be generated from an impulse transmitted from each of second wireless communication device 104's two antennas. In some embodiments, the impulse may represent a shortduration time-domain signal. Together, the first and second multipath channel impulse response estimations 406 and 408 may represent second wireless communication device 104's estimation of wireless communication link 400. These example operations may be representative of operation 312 discussed above with reference to FIG. 3.

In some example situations, each impulse transmitted from second wireless communication device 104's antennas may result in the reception of two multipath signals at first wireless communication device 102. As will be apparent to those skilled in the relevant art(s), second multipath channel impulse response estimation 408 may be indicative of a cleaner channel—e.g., less multipath fading—than the channel represented by impulse response estimation 406. Indeed, in the example of FIG. 4, second multipath channel impulse response estimation 408 illustrates the reception of two multipath signals (e.g., a first reception at approximately 300 ns and a second reception at approximately 330 ns). Conversely, first multipath channel impulse response estimation 406 does not show the reception of two distinct multipath signals, and instead only shows a single elongated peak thereby making it difficult to accurately determine the reception times for the two multipath signals received at first wireless communication device 102.

A person skilled in the relevant art(s) would appreciate that when two multipath signals are received at a device, the first such reception may be a more accurate indication of the true line of sight between two wireless communication devices. Indeed, those skilled in the art will recognize that a delay in the reception of the second signal is likely due to the second signal's refraction and/or reflection from one or more objects within the wireless environment (e.g., multipath fading). Therefore, in the example of FIG. 4, the first multipath signal reception shown by second multipath channel impulse response estimation 408 may be an accurate representation of the true line of sight 410 from first wireless communication device 102 to second wireless communication device 104. The determination of the first multipath signal reception in second multipath channel impulse response estimation 408 (e.g., true line of sight 410) may be representative of operation 314 discussed above with reference to FIG. 3.

In some embodiments, second wireless communication device 104's first antenna may represent its transmitting antenna, while the second antenna may represent second wireless communication device 104's receiving antenna. In such a scenario, those skilled in the art will recognize that first multipath channel impulse response estimation 406, which corresponds to second wireless communication device 104's first antenna, may be substantially similar to the multipath channel impulse response estimation 412 generated by first wireless communication device 102 (illustrated in graph 404). In other words, the multipath channel between second wireless communication device 104's first antenna and first wireless communication device 102 may be more representative of the path that a wireless signal (e.g., first wireless signal 332) takes from second wireless communication device 104 to first wireless communication device 102, than is the multipath channel between second wireless communication device 104's second antenna (e.g., the receiving antenna) and first wireless communication device 102. Therefore, because it is difficult for second wireless communication device 104 to accurately determine the true line of sight 410 based solely on first multipath channel impulse response estimation 406, it may be equally difficult for first wireless communication device 102 to determine the true line of sight (or first time of arrival t2) based solely on its own multipath channel impulse response estimation 412, which as discussed may have been generated in operation 320. Indeed, the single peak seen by first wireless communication device 102 may represent the superposition of the two received multipath signals. Thus, both first multipath channel impulse response estimation 406 and estimation 412 may be indicative of a channel that is significantly affected by multipath fading.

However, in accordance with the improved time of flight estimation embodiments disclosed herein, the more capable station (e.g., second wireless communication device 104) has the ability to transmit a correction metric 303 to the less capable station (e.g., first wireless communication device 102) in order to help correct errors in the line of sight (or first time of arrival t2) calculations made by the less capable station (see, e.g., operation 322 in FIG. 3). As discussed above, the correction metric 303 may represent second wireless communication device 104's estimation/characterization of wireless communication link 400 (e.g., represented collectively by first and second multipath channel impulse response estimations 406 and 408), estimated true line of sight 410, the compressed representation of second wireless communication device 104's estimation of wireless communication link 400 (e.g., the difference 414 between the peak of first multipath channel impulse response estimation 406 and true line of sight 410), and/or any combination thereof.

In the example scenario where second wireless communication device 104 transmits the difference 414 between the peak of first multipath channel impulse response estimation 406 and true line of sight 410 to first wireless communication device 102, first wireless communication device 102 may subtract difference 414 from the peak of its own multipath channel impulse response estimation 412 to determine true line of sight 416 (e.g., first time of arrival t2). This example scenario may be representative of operation 326 discussed above with reference to FIG. 3. Moreover, the scenarios where second wireless communication device 104 transmits (and first wireless communication device subsequently uses) its estimation/characterization of wireless communication link 400 and/or its estimated true line of sight 410 as correction metric 303 were already discussed above, and may also be representative of operations 322 and 326 from FIG. 3.

Once first wireless communication device 102's line of sight (or first time of arrival t2) calculation errors are corrected, first wireless communication device 102 can transmit accurate first time of arrival (t2) and second time of departure (t3) calculations to second wireless communication device 104 (see, e.g., operation 328 in FIG. 3). Subsequently, second wireless communication device 104 can use the four timestamps (t1-t4) to perform an improved the time of flight estimation relative to first wireless communication device 102, where the estimation is substantially free from errors caused by multipath fading, or the like (see, e.g., operation 330 in FIG. 3).

Although second wireless communication device 104 is described in FIG. 4 as being the more capable station due to having multiple antennas, second wireless communication device 104 may also have other capabilities that would allow it to more accurately estimate wireless communication link 400. For example, second wireless communication device 104 could have accurately estimated wireless communication link 400, true line of sight 410, and the compressed representation of wireless communication link 400 using a different capability such as any/all of an improved noise floor, an ability to analyze the transmission and reception of previously communicated signals (time diversity), improved computational abilities (e.g., the ability to implement a super-resolution algorithm), dedicated hardware for processing multipath signals, improved processing power, to name just a few examples, without departing from the spirit and scope of the present disclosure. Indeed, second wireless communication device 104 can similarly use a super-resolution algorithm to identify various multipath signal receptions and accurately determine a time of the first reception (e.g., a true line of sight).

Figure 5:
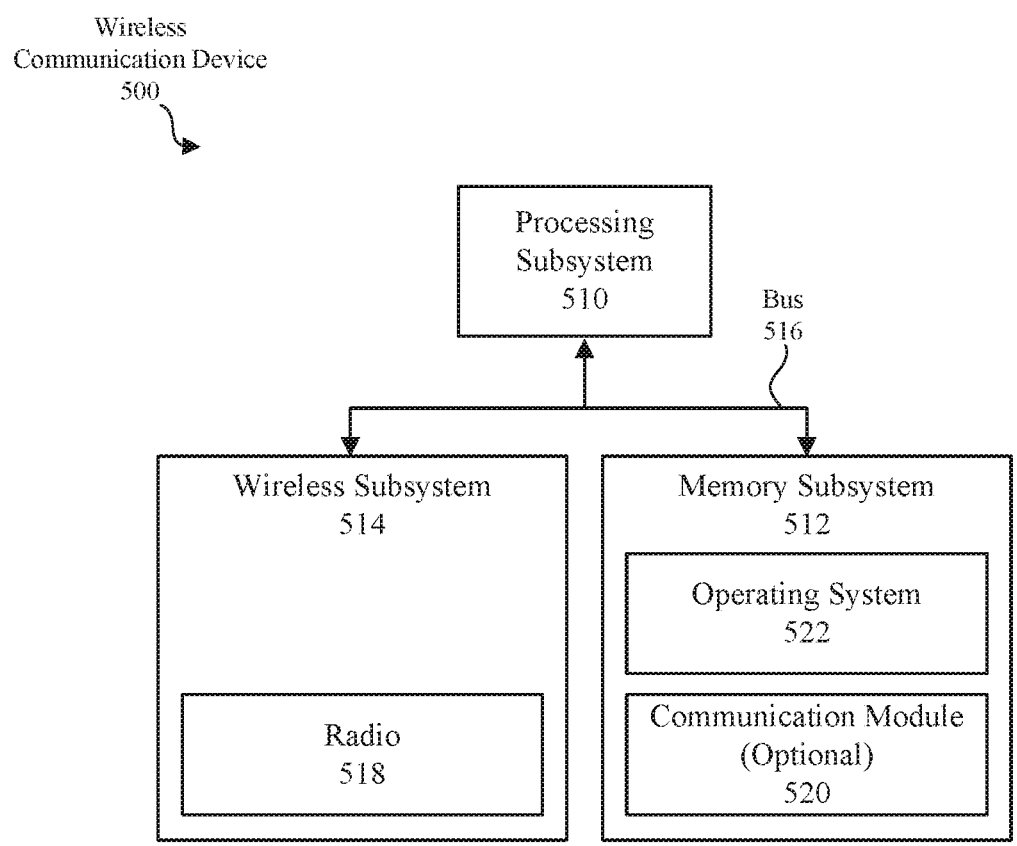
FIG. 5 illustrates an example block diagram of a wireless communication device according to according to some embodiments.

Example internal components of first and second wireless communication devices 102 and 104 will now be described in further detail with reference to FIG. 5. FIG. 5 illustrates a block diagram of an example wireless communication device 500 according some embodiments. Wireless communication device 500 may represent an exemplary embodiment of first wireless communication device 102 or second wireless communication device 104. Wireless communication device 500 may include a processing subsystem 510, a memory subsystem 512, and a wireless subsystem 514.

Processing subsystem 510 may include one or more devices that perform computational operations. For example, processing subsystem 510 can include one or more microprocessors, application-specific integrated circuits (ASICs), microcontrollers, and/or programmable-logic devices. Processing subsystem 510 may execute an operating system 522 (stored in memory subsystem 512) that includes procedures (or a set of instructions) for handling various basic system services for performing hardware-dependent tasks.

Memory subsystem 512 may include one or more devices for storing data and/or instructions for processing subsystem 510 and wireless subsystem 514. For example, memory subsystem 512 can include dynamic random access memory (DRAM), static random access memory (SRAM), and/or other types of memory. More generally, memory subsystem 512 may include volatile memory and/or non-volatile memory that are configured to store information. In addition, memory subsystem 512 can include mechanisms for controlling access to the memory. In some embodiments, memory subsystem 512 includes a memory hierarchy that comprises one or more caches coupled to a memory in electronic device 500. Additionally or alternatively, one or more of the caches may be located in processing subsystem 510.

Moreover, memory subsystem 512 may be coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device may be used to store less frequently used data.

Wireless subsystem 514 may include processors, controllers, radios/antennas, sockets/plugs, and/or other devices used for engaging in wireless communication with another wireless communication device—e.g., communicating packets or frames with another device via a wireless communication link. As discussed previously, those skilled in the relevant art(s) will recognize that wireless communication device 500 may be configured to communicate using any one of Wi-Fi, Bluetooth, radio-frequency identification (RFID), near field communications (NFC), 60 GHz communications, cellular communication, or the like. Therefore, wireless subsystem 514 may be configured to enable communication with another wireless communication device via any one of these wireless protocols. The mechanisms used for coupling to, communicating on, and handling data and events on the wireless link may be referred to collectively as an "interface" or "wireless interface" herein.

Within electronic device 500, processing subsystem 510, memory subsystem 512, and wireless subsystem 514 may be coupled together using bus 516. Bus 516 may be an electrical, optical, or electro-optical connection that the subsystems can use to communicate commands and data among one another. Although wireless communication device 500 is shown with only one bus 516, a different number or configuration of electrical, optical, or electro-optical connections among the subsystems is possible without departing from the spirit and scope of the present disclosure.

Similarly, wireless communication device 500 may be implemented as a standalone or a discrete device or may be incorporated within or coupled to another electrical device or host device, such as a cellphone, smartwatch, portable computing device, a camera, or a Global Positioning System (GPS) unit or another computing device such as a personal digital assistant, a video gaming device, a laptop, a desktop computer, a tablet, or a computer peripheral such as a printer or a portable audio and/or video player to provide some examples and/or any other suitable electronic device that will be apparent to those skilled in the relevant art(s) without departing from the spirit and scope of the present disclosure.

In some embodiments, wireless communication device 500 may include one or more additional processing subsystems 510, memory subsystems 512, and/or wireless subsystems 514. Additionally, it may be possible for one or more of these subsystems to be omitted from wireless communication device 500. Moreover, wireless communication device 500 may include one or more additional subsystems that are not shown in FIG. 5. For example, electronic device 500 can include, but is not limited to: a display subsystem for displaying information, a data collection subsystem, an audio and/or video subsystem, an alarm subsystem, a media processing subsystem, and/or an input/output (I/O) subsystem. Also, although separate subsystems are shown in FIG. 5, some or all of a given subsystem can be integrated into one or more of the other subsystems in wireless communication device 500 and/or positions of components in electronic device 500 can be changed without departing from the spirit and scope of the present disclosure.

As illustrated in FIG. 5, wireless subsystem 514 may include radio 518, which itself may include hardware and/or software mechanisms that can be used for transmitting and receiving wireless signals to and from other wireless communication devices. Although wireless subsystem 514 is described having only a single radio 518, those skilled in the relevant art(s) will recognize that additional radios could also be included.

In some embodiments, wireless communication between device 500 and other wireless communication devices may be implemented using low-level hardware, such as in a physical layer, a link layer and/or a network layer in a network architecture. For example, wireless communication may, at least in part, be implemented in a media access control layer. However, in other embodiments at least some of the wireless communication operations are performed by one or more programs, modules, or sets of instructions (such as optional communication module 520 stored in memory subsystem 512), which may be executed by processing subsystem 510. The one or more programs may constitute computer-program mechanisms. Furthermore, instructions in the computer-program mechanisms in the various modules in memory subsystem 512 may be implemented in: a high-level procedural language, an object-oriented programming language, and/or in an assembly or machine language. Note that the programming language may be compiled or interpreted, e.g., configurable or configured, to be executed by processing subsystem 510.

As discussed above, wireless communication device 500 may represent an exemplary embodiment of first wireless communication device 102, and/or second wireless communication device 104. In such scenarios, processing subsystem 510 may be configured to perform at least the following functions associated with the improved time of flight estimation method illustrated in FIG. 3: estimating a wireless communication link, estimating a true line of sight, generating a compressed representation of the wireless communication link estimation, correcting line of sight errors first time of arrival (t2)) using a correction metric, calculating a ToF between wireless communication device 500 and other wireless communication devices, calculating a separation distance between wireless communication device 500 and other wireless communication devices; and determining whether other wireless communication devices are within an acceptable separation distance.

Moreover, wireless subsystem 514 may be configured to perform at least the following functions associated with the improved time of flight estimation method illustrated in FIG. 3: sending/receiving a correction metric, and sending/receiving first and second wireless signals.

The procedures (or set(s) of instructions) for performing the aforementioned functions may be included in operating system 522 stored in memory subsystem 512. Additionally, memory subsystem 512 may be configured to store various other forms of information that are used during the improved time of flight estimation method illustrated in FIG. 3, such as the wireless communication link estimation, the true line of sight estimation, the compressed representation of the wireless communication link estimation, time of departure estimations, and time of arrival estimations, to provide some examples.

In some embodiments, a tangible apparatus or article of manufacture comprising a tangible computer useable or readable medium having control logic (software) stored thereon is also referred to herein as a computer program product or program storage device. This includes, but is not limited to, processing system 110, memory subsystem 512, operating system 522, and communication module 520, as well as tangible articles of manufacture embodying any combination of the foregoing. Such control logic, when executed by one or more data processing devices (such as processing system 110), causes such data processing devices to operate as described herein.

Based on the teachings contained in this disclosure, it will be apparent to persons skilled in the relevant art(s) how to use the discussed techniques using data processing devices, computer systems and/or computer architectures other than that shown in FIG. 5. In particular, embodiments may operate with software, hardware, and/or operating system implementations other than those described herein.

Additionally, embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

CONCLUSION

It is to be appreciated that the Detailed Description section, and not the Summary and Abstract sections, is intended to be used to interpret the claims. The Summary and Abstract sections may set forth one or more, but not all, exemplary embodiments of the disclosure as contemplated, and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A method for estimating a time of flight between a first wireless communication device and a second wireless communication device, comprising:
    monitoring, by the first wireless communication device, a wireless communication link;
    generating a wireless communication link estimation based at least in part on the monitoring;

deriving a correction metric, wherein the correction metric is based at least in part on the generated wireless communication link estimation;

delivering the correction metric from the first wireless communication device to the second wireless communication device;

receiving a first signal from the second wireless communication device, wherein the first signal includes a corrected time of arrival calculation corresponding to a second signal transmitted from the first wireless communication device to the second wireless communication device; and estimating, using the received second signal, the time of flight of the first signal.

2. The method of claim 1, further comprising: calculating a separation distance between the first wireless communication device and the second wireless communication device using the estimated time of flight.

3. The method of claim 2, further comprising:
comparing the calculated separation distance to a threshold distance; and
performing an action at the first wireless communication device based on comparing the calculated separation distance to the threshold distance.

4. The method of claim 1, further comprising: estimating a true line of sight between the first wireless communication device and the second wireless communication device using the generated wireless communication link estimation.

5. The method of claim 4, further comprising: generating a compressed representation of the wireless communication link estimation.

6. The method of claim 5, wherein the compressed representation includes a difference between a peak of the generated wireless communication link estimation and the estimated true line of sight.

7. The method of claim 6, wherein the correction metric comprises at least one of the generated wireless communication link estimation, the estimated true line of sight, or the compressed representation of the wireless communication link estimation.

8. The method of claim 4, further comprising: rotating the generated wireless communication link estimation in a frequency domain such that the estimated true line of sight is indexed at zero.

9. The method of claim 1, wherein the wireless communication link estimation is generated by the first wireless communication device using at least one of a spatial diversity technique or a super-resolution algorithm.

10. The method of claim 1, wherein the corrected time of arrival calculation is substantially free from multipath fading errors.

11. A system for estimating a time of flight, comprising:
a first wireless communication device; and
a second wireless communication device;
wherein a wireless communication link is established between the first wireless communication device and the second wireless communication device,
wherein the first wireless communication device is configured to monitor the wireless communication link, generate a wireless communication link estimation, derive a correction metric using the generated wireless communication link estimation, and transmit the correction metric and a first signal to the second wireless communication device,
wherein the second wireless communication device is configured to receive the correction metric and the first signal, calculate a time of arrival of the first signal, correct an error associated with the time of arrival calculation using the received correction metric, and transmit a second signal comprising a corrected time of arrival associated with the first signal to the first wireless communication device, and
wherein the first wireless communication device is further configured to receive the second signal and use the corrected time of arrival to estimate the time of flight of the first signal.

12. The system of claim 11, wherein the system comprises an asymmetric system.

13. The system of claim 12, wherein the first wireless communication device includes a plurality of antennas and the second wireless communication device includes only one antenna.

14. The system of claim 11, wherein the first signal comprises a WiFi signal.

15. The system of claim 11, wherein the correction metric comprises at least one of the wireless communication link estimation, a true line of sight estimation, or a compressed representation of the wireless communication link estimation.

16. The system of claim 11, wherein the second wireless communication device is further configured to generate a second wireless communication link estimation, and determine a cross-correlation between the wireless communication link estimation generated by the first wireless communication device and the second wireless communication link estimation.

17. The system of claim 11, wherein the first wireless communication device comprises a computer and wherein the second wireless communication device comprises a wearable device or a mobile phone.

18. A system for estimating a time of flight, comprising:
a first wireless communication device; and
a second wireless communication device;
wherein a wireless communication link is established between the first wireless communication device and the second wireless communication device,
wherein the first wireless communication device is configured to monitor the wireless communication link, generate a wireless communication link estimation, derive a correction metric using the generated wireless communication link estimation, and transmit a first signal to the second wireless communication device,
wherein the second wireless communication device is configured to receive the first signal, calculate a time of arrival of the first signal, and transmit a second signal comprising the time of arrival calculation associated with the first signal to the first wireless communication device,
wherein the time of arrival calculation associated with the first signal comprises at least one error, and
wherein the first wireless communication device is further configured to receive the second signal, correct the at least one error in the time of arrival calculation associated with the first signal using the correction metric, and use the corrected time of arrival to calculation to estimate the time of flight of the first signal.

19. The system of claim 18, wherein the correction metric comprises at least one of the generated wireless communication link estimation, an estimated true line of sight, or a compressed representation of the wireless communication link estimation.

20. The system of claim 18, wherein the corrected time of arrival to calculation is substantially free from multipath fading errors.

\* \* \* \* \*